June 9, 1953 R. C. HENSHAW 2,641,434
SHOCK AND VIBRATION ISOLATING MOUNTING
Filed Sept. 8, 1947 2 Sheets-Sheet 1

Inventor
Richard C Henshaw
Ralph Hammar
By Attorney

June 9, 1953   R. C. HENSHAW   2,641,434
SHOCK AND VIBRATION ISOLATING MOUNTING
Filed Sept. 8, 1947   2 Sheets-Sheet 2
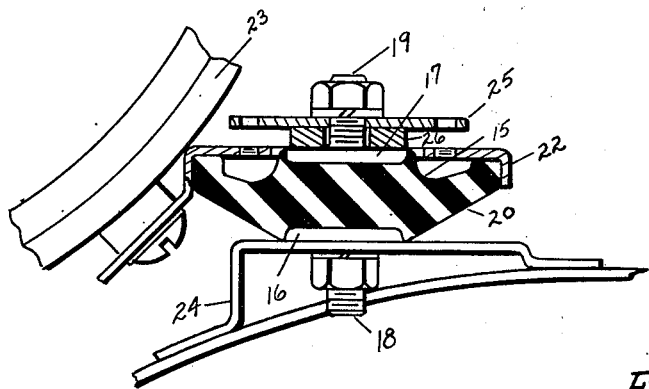
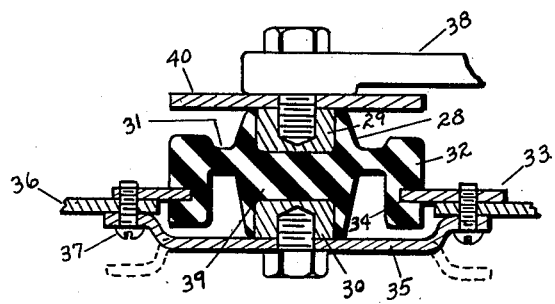
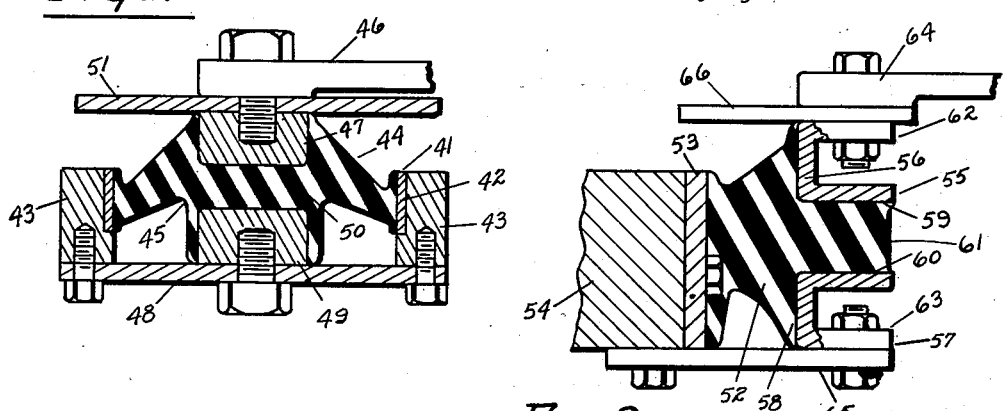
Inventor
Richard C Henshaw
Ralph Hammar
By
Attorney Patented June 9, 1953

2,641,434

UNITED STATES PATENT OFFICE 2,641,434

SHOCK AND VIBRATION ISOLATING MOUNTING

Richard C. Henshaw, Erie, Pa., assignor to Lord Manufacturing Company, Erie, Pa., a corporation of Pennsylvania Application September 8, 1947, Serial No. 772,747

13 Claims. (Cl. 248—358)

1

In many instances it is desirable that equipment be protected from shock during shipment and be supported to isolate vibrations during use. This invention is intended to accomplish both objects in a combined shock and vibration isolating mounting. In a preferred form the conversion from shock to vibration isolation may be effected by removing screws. Further objects and advantages appear in the specification and claims.

Figure 1:
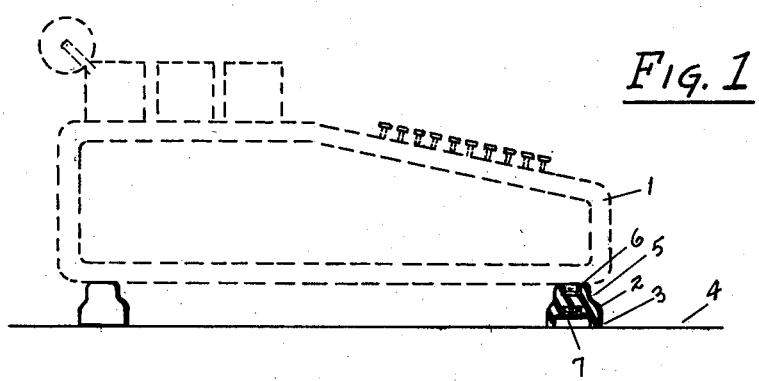
Figure 2:
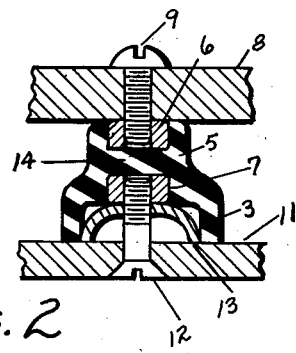
Figure 3:
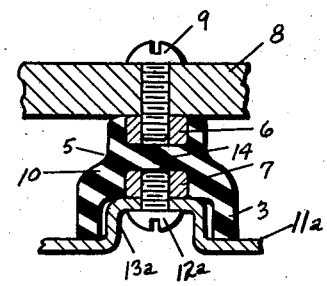
Figure 4:
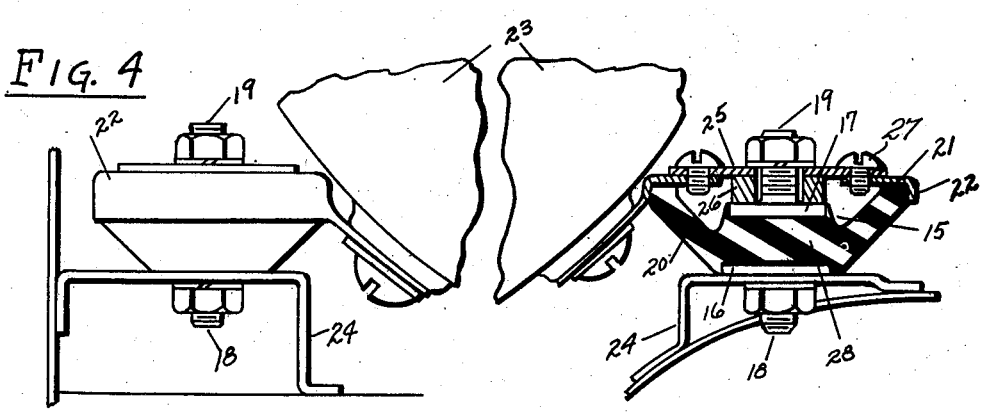
Figure 3A:
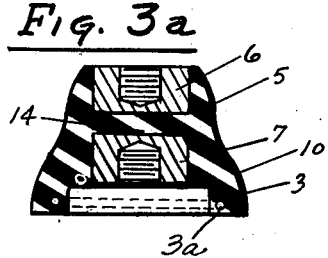

In the accompanying drawings, Fig. 1 is a diagrammatic view illustrating a shock and vibration isolating mounting in vibration isolating condition; Figs. 2 and 3 are fragmentary sections of the mounting conditioned to isolating shock, Fig. 3a is a section through a modification of the Figs. 1-3 mounting; Fig. 4 is a side elevation, partly in section, of a modification in shock isolating position; Fig. 5 is a sectional view through the Fig. 4 mounting in vibration isolating position; Figs. 6, 7 and 8 are sectional views through modifications in shock isolating position.

Referring to the drawing, 1 indicates a calculating machine which may be considered as representative of a class of articles requiring protection from shock during shipment and vibration isolation during use. During use the calculating machine is supported by bell or cup-shaped rubber feet 2 having a flexible depending skirt 3 for engagement with a supporting surface 4 and having a central hub 5 with nuts 6 and 7 bonded in the upper and lower ends thereof. As indicated in Figs. 2 and 3, the rubber feet are attached to the base 8 of the calculating machine by screws 9 threaded into the nut 6. In the vibration isolating position the hub 5 is substantially undistorted by the vibration load. Vertical vibrations are isolated by shear of the rubber in the region 10 between skirt 3 and the hub 5. Lateral vibrations are isolated by shear in the portion of the skirt 3 between the supporting surface 4 and the bottom of the hub 5. The proportions of the vibration isolating sections 3 and 10 are determined by the weight of the supported article and the frequency of the vibrations to be isolated. These proportions are well understood and may be readily calculated for any particular installation.

During shipment a base 11 which may be part of the shipping crate or pack, or which may be part of the article to be supported, is connected to the underside of the hub by a screw 12 threaded into the nut 7. A cup-shaped washer 13 fits snugly against the inner wall of the skirt 3 and

2 effectively bridges or short circuits the skirt so that it is substantially ineffective during shipment. That is, the washer 13 makes a substantially rigid connection between the nut 7 and the base 11. During shipment the shock or impact load is isolated by the relatively stiff section of rubber 14 in the center of the hub 5 and between the adjacent faces of the nuts 6 and 7. This section of rubber is too stiff to isolate the normal vibrations but is effective in isolating shock or impact.

In the modification shown in Fig. 3 the base 11a has an integral projection 13a which performs the same function as the washer 13 when the screw 12a is threaded into the nut 7. In either the Fig. 2 or Fig. 3 constructions, upon removal of the screws 12, 12a, the rubber mounting is changed from its shock isolating condition to its vibration isolating condition.

In order to prevent spreading of the skirt 3, a ring 3a may be imbedded in the lower end as shown in Fig. 3a. This does not change the vibration or shock isolating characteristics.

In the modification shown in Fig. 4 the shock and vibration isolating mounting has a hub 15 in opposite ends of which are bonded heads 16, 17 of studs 18, 19. Extending from the lower end of the hub is an inclined conical web 20 having its rim 21 seated in a cup-shaped bracket 22 attached to an article 23. The web 20 is proportioned to isolate vibrations predominantly in shear between the relatively undistortable rim 21 and the hub 15. The studs 18 are bolted to supporting brackets 24. The stud 19 has bolted thereon a limiting or safety washer 25 positioned on the stud by a spacing washer 26. The washer 25 overlaps the top of the cup-shaped bracket 22 and during shipment is solidly connected to the bracket by screws 27. This solidly connects the bracket 22 with the stud 19 and effectively bridges or short circuits the vibration isolating web 20. During shipment, shock or impact is cushioned or isolated by the section of rubber 28 between the heads 16, 17 of the studs. Upon removing the screws 27 the weight of the supported article 23 deflects the web 20 downward providing the desired spacing between the top of the bracket 22 and the washer 25 for limiting the amplitude of vibration. As in the previously described construction the change from shock isolation to vibration isolation is effected by removal of hold down screws.

In the modification shown in Fig. 6, the mounting has a central hub 28 with nuts 29 and 30 bonded in the upper and lower ends. Extending from the hub is a web 31 proportioned to isolate vibrations and terminating in a rim 32 bonded to an attaching plate 33 and overlapping the faces of the attaching plate around an opening 34. Under vibration loads the hub 28 and the rim 32 are effectively rigid and form end walls for the web 31 which yields in shear to isolate vibrations. The mounting is shown in the shock isolating position in which a washer 35 is bolted at its center to the nut 30 and is fastened at its edges to a base 36 and also to the attaching plate 33 by screws 37. The supported article 38 which is bolted to the nut 29 is protected from shock or impact by the section of rubber 39 between the nuts 29 and 30. The vibration isolating web 31 is substantially ineffective to cushion shock. To condition the mounting for vibration isolation, the screws 37 are removed and the washer 35 is bolted to the nut 30 in an inverted position. The weight of the supported article 38 deflects the web 31 downward so that the washer 35 cooperates with the lower end of the rim 32 to provide a yielding stop limiting the amplitude of vibrations. A similar washer 40 cooperates with the upper edge of the rim. Inverting the washer 35 provides sufficient clearance so that the screws 37 may be replaced to fasten the attaching plate 33 to the base 36.

In the modification shown in Fig. 7, the mounting has a tubular shell 41 seated in a socket 42 in a base 43. The tubular shell is bonded to the rim of a conical vibration isolating web 44 extending from a hub 45. The supported article 46 is bolted to a nut 47 bonded in the upper end of the hub. During shipment a bridging member 48 is bolted to a nut 49 bonded in the lower end of the hub and is also solidly fastened at its ends to the base 43. This conditions the mounting for shock isolation which is effected primarily by the rubber in the region 50 between the nuts 47 and 49. Upon unfastening the ends of the bridging member 48 the weight of the supported article deflects the web 44 downward and spaces the bridging member from the underside of the base where it serves as a limiting stop. A similar limiting stop is also provided by a washer 51 at the upper end of the hub.

In Fig. 8 is shown a sandwich type modification of the shock and vibration isolating mounting. This mounting has a body of rubber 52 sandwiched between a vertical plate 53 fixed to a base 54 and a U-shaped bracket 55 having a vertical face 56 opposing the plate 53. Directly below the bracket 55 is a similar U-shaped bracket 57 having a face 58 substantially in line with the face 56. The inner arms 59 and 60 of the brackets are bonded to opposing sides of a section of rubber 61 proportioned to isolate shock. During vibration isolation the section of rubber 61 is effectively rigid so that the shear deflection of the section of rubber 52 is substantially the same as though a single continuous metallic wall were inserted in the rubber so as to form a connection between the faces 56 and 58. The outer arms 62 and 63 of the brackets are respectively bolted to the supported member 64 and to a bridging member 65. During shipment the bridging member 65 is solidly connected to the base 54. Upon releasing the connection between the bridging member and the base it serves as a limiting stop. A similar stop 66 may be provided at the upper side of the face.

In all forms there is a vibration isolating section (3, 10, 20, 31, 44, 52) extending from a shock isolating section (14, 26, 39, 50, 61) substantially rigid to vibration loads. In the shock isolating section are bonded connectors (5, 7, 16, 17, 29, 30, 47, 49, 55, 57) which connect the supported article to its support through the shock isolating section. In all forms the vibration isolating section is unloaded during shock isolation. This prevents set of the vibration isolating section during storage. The term rubber is used to include natural and synthetic rubber and equivalent resilient material.

What I claim as new is:

1. A shock and vibration mounting alternatively usable to isolate vibration during use or to isolate shock during shipping comprising a body of rubber having a pair of spaced connections for connection respectively to a supporting and a supported member, said connections being separated by a section of rubber proportioned to isolate vibration, another connection in said body separated from one of said pair of connections by a section of rubber proportioned to isolate shock and forming with said one connection an alternative pair of connections for connection respectively to said supporting and supported member during shipping to isolate shock, said other connection being disconnectible.

2. A shock and vibration isolating mounting alternatively usable to isolate vibration during use or to isolate shock during shipping comprising spaced connections to a supporting and a supported member, a body of rubber intermediate and joined to the connections, said body being proportioned to form a vibration isolating connection between the connections, and a releasable rigid connector bridging a portion of the body of rubber and leaving the remainder of the rubber free whereby when the releasable connector is attached in bridging relation the remainder of the body of rubber is proportioned to isolate shock and when the bridging connection is released the entire body of rubber is free to isolate vibration.

3. A mounting for isolating shock and vibration between supporting and supported members, having a connection to one of the members, spaced connections to the other of the members including a releasable bridging member between the spaced connections, and a body of rubber having a portion between the first connection and one of the spaced connections proportioned to isolate shock and a portion between the first connection and the other spaced connection proportioned to isolate vibration, said latter portion being bridged by the bridging member.

4. A shock and vibration isolating mounting alternatively usable to isolate vibration during use or to isolate shock during shipping comprising a body of rubber having a wall of rubber substantially undistortable under vibration loads and a section of rubber offset from said wall yieldable under vibration loads, supporting and supported members, one of the members being connected to the wall and the other of the members being alternatively connected to the offset section and to the wall, the connections to the wall being separated by a section of rubber yieldable under shock loads.

5. A shock and vibration isolating mounting alternatively usable to isolate vibration during use or to isolate shock during shipping comprising a body of rubber having a wall of rubber substantially undistortable under vibration loads and a section of rubber offset from said wall yieldable under vibration loads, opposed connectors in said wall for connection respectively to supporting and supported members, said connectors being separated by a section of rubber yieldable under shock loads but substantially undistortable by vibration whereby when said opposed connectors are connected respectively to the supporting and supported members, a shock protecting connection is established therebetween, one of said connectors being disconnectable from the member to which it is connected in the shock protection position and an alternative connection from said latter member to said section of rubber yieldable under vibration loads whereby when the alternative connection is made and said one connector is disconnected a vibration isolating connection is established between the supporting and supported members.

6. A mounting for alternatively isolating shock and vibration between supporting and supported members, comprising a body of rubber having a hub for connection to one of the members, a rim for connection to the other of the members, and an intervening vibration isolating web, the hub being proportioned to isolate shock but substantially undistortable under vibration load, an alternative connection to the hub spaced from the connection between the hub and said one member, and a disconnectible bridge connecting the alternative connection and rim.

7. A mounting for alternatively isolating shock and vibration between supporting and supported members, comprising a bell shaped foot of rubber having a depending load carrying skirt yieldable under vibration for engaging a supported surface and a hub at the center of the skirt having its lower end spaced above the supporting surface in the load carrying position, spaced attachment members in the hub for connection respectively to the supported member and the supporting member, the connection from the attachment member to the supporting member being disconnectable and the attachment members being separated by a section of rubber relatively undistortable under vibration but yieldable under shock, whereby when the attachment members are connected respectively to the supporting and supported members the supported member is protected from shock and when the connection between one of the attachment members and the supporting member is broken, the supported member is conditioned for support in vibration isolating relation on a supporting surface engaged by the depending skirt.

8. A mounting for alternatively isolating shock and vibration between supported and supporting members comprising a plate for connection to one of the members having an opening therein, a body of rubber having a rim fixed in said opening, a hub and an intervening vibration isolating web, and a pair of spaced connectors in the hub for connection respectively to the supporting and supported members, said connectors being separated by a section of rubber relatively unundistortable under vibration but yieldable under shock whereby when the spaced connectors are connected respectively to the supporting and supported members the supported member is protected from shock, and whereby when the connector connected to said one of the supporting and supported members is disconnected the supported member is protected from vibration.

9. A mounting for alternatively isolating shock and vibration between supported and supporting members comprising a plate for connection to one of the members having an opening therein, a body of rubber having a rim fixed in said opening, a hub for connection to the other members, and an intervening vibration isolating web, another connector in the hub spaced from the connection to said other member by a section of rubber relatively undistortable under vibration but yieldable under shock, and a removable bridging member between the plate and the alternative hub connector overlapping the rim and transferring load from the relatively undistortable rubber section to the plate, whereby when the bridging member is in place, the mounting is conditioned to protect against shock and when the bridging member is disconnected, the mounting is conditioned to isolate vibration.

10. A shipping pack for an article comprising a supporting base, a bell shaped foot of rubber having a depending load carrying skirt yieldable under vibration for engaging a supporting surface and a hub at the center of the skirt and spaced above the supporting surface in the load carrying position, said hub having fixed thereto attachment members separated by a section of rubber relatively undistortable under vibration but yieldable under shock, one of the attachment members being connected to the article and the other to the base, said base attachment member being disconnectible to place the foot in condition to support the article in vibration isolating relation on a supporting surface.

11. A shipping pack for an article having a vibration isolating mounting between the article and its support, said mounting including a body of rubber proportioned to isolate vibration comprising, a supporting base, spaced attachment members fixed to the body separated by a section of rubber relatively undistortable under vibration but yieldable under shock, and alternative connections from one of the attachment members to the article and from the other of the attachment members to the base, one of said alternative connections being disconnectible after shipping to condition the mounting for vibration isolation.

12. A shipping pack for an article comprising a base, a body of rubber having a wall relatively undistortable under vibration and a section offset from said wall yieldable in shear under vibration, spaced connectors in the wall separated by a section of rubber yieldable under shock, a connection on the offset section remote from the wall, one of the spaced connectors and the offset connector being connected to the article and the other to the base, and a bridging member from the offset connector to the other of the spaced connectors, the bridging member having a connection fastening deflecting the offset section of rubber in a direction opposite to the deflection under normal load whereby upon release of the fastening the bridging member serves as a limiting stop for excessive amplitude of vibration.

13. In a combined shock and vibration isolating mounting alternatively usable to isolate vibration during use or to isolate shock during shipping, a body of rubber having spaced walls connected by a section proportioned to isolate vibrations, a pair of connectors in one of the walls for connection respectively to supported and supporting members, said pair of connectors being separated by a section of rubber proportioned to isolate shock but substantially rigid under vibration, whereby when said connectors are connected, the mounting is conditioned to isolate shock, the connector to one of the members being disconnectible, and another connector to said one member in the other of the spaced walls, whereby when said one connector is disconnected, the mounting is conditioned to isolate vibration.

RICHARD C. HENSHAW.

References Cited in the file of this patent

UNITED STATES PATENTS

| Number | Name | Date |
|---|---|---|
| 2,018,860 | Lord | Oct. 29, 1935 |
| 2,156,301 | Loewus | May 2, 1939 |
| 2,223,028 | Dobson | Nov. 26, 1940 |
| 2,268,306 | Sarti | Dec. 30, 1941 |
| 2,347,629 | Hale | Apr. 25, 1944 |
| 2,351,725 | Wack | June 20, 1944 |
| 2,361,529 | Briggs | Oct. 31, 1944 |
| 2,397,804 | Nakken et al. | Apr. 2, 1946 |
| 2,407,014 | Jones | Sept. 13, 1946 |
| 2,447,712 | Nathan | Aug. 24, 1948 |

FOREIGN PATENTS

| Number | Country | Date |
|---|---|---|
| 506,156 | Germany | Aug. 8, 1929 |